J. T. Taylor. Combination Lock.

No. 120,125.      Patented Oct. 17, 1871.

Witnesses:
A. W. Almqvist
Wm. H. C. Smith.

Inventor:
J. T. Taylor.

Per Munn & Co
Attorneys.

UNITED STATES PATENT OFFICE.

JACKSON T. TAYLOR, OF NEWNAN, GEORGIA.

IMPROVEMENT IN ALARM-LOCKS.

Specification forming part of Letters Patent No. 120,125, dated October 17, 1871.

*To all whom it may concern:*

Be it known that I, JACKSON T. TAYLOR, of Newnan, in the county of Coweta and State of Georgia, have invented a new and useful Improvement in Combination-Lock; and I do hereby declare that the following is a full, clear, and exact description thereof, which will enable others skilled in the art to make and use the same, reference being had to the accompanying drawing forming part of this specification, in which—

Figure 1:
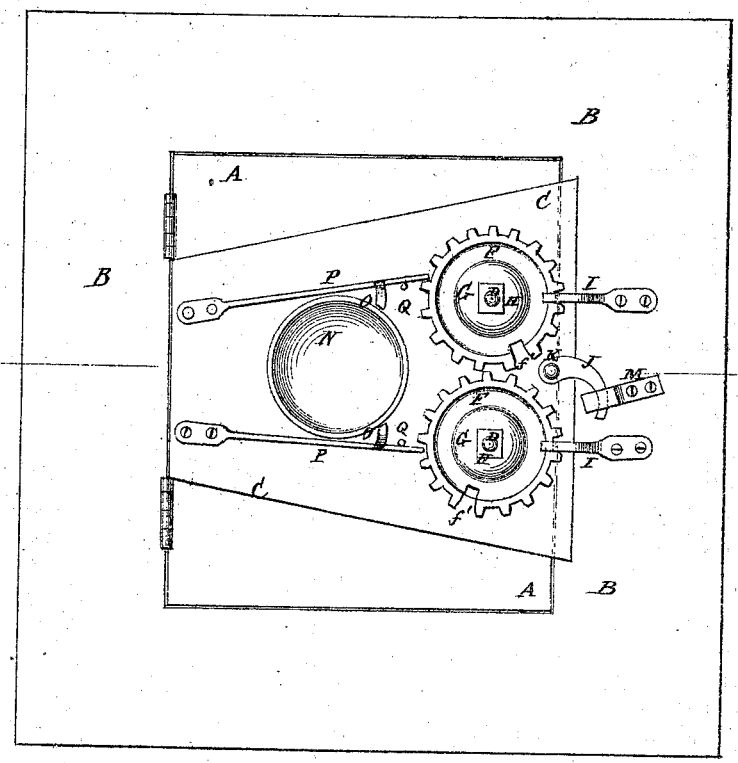
Figure 2:
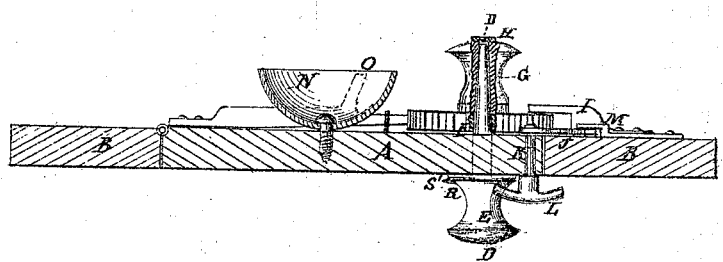

Figure 1 is a detail view of my improved lock. Fig. 2 is a detail sectional view of the same taken through the line $x\ x$, Fig. 1.

Similar letters of reference indicate corresponding parts.

My invention has for its object to furnish an improved combination-lock, simple in construction, and at the same time convenient in use, effective in operation, being susceptible of a great number of combinations, and safe against the operations of burglars. My invention consists in certain improvements upon door-locks, which will be first fully described and subsequently pointed out in the claims.

A represents a door, and B the door-frame or casing. C is the lock-plate, which is attached to the inner side of the door A. D are spindles having knobs E formed solidly upon their outer ends. The spindles D pass through the door A, through the lock-plate C, through holes in the center of the cog or toothed wheels F, through the knobs G, and have hand-nuts H screwed upon their inner ends. The holes through the toothed wheels F, and the parts of the spindles D that pass through them are made tapering or conical, so that the said wheels and spindles may be made to move together by forcing the said wheels down tightly upon said spindles by screwing up the nuts H, and so that the toothed wheels may be readily turned upon said spindles to change the combination by simply loosening the said nuts H, and again secured to the spindles by tightening said nuts. In each of the toothed wheels F is formed a slot, $f'$, by deepening the notch between two of the teeth of said wheels, said slots being made sufficiently deep to allow the catches I to pass through them. The catches I are attached to the door-frame or casing B, and are so formed, as shown in Figs. 1 and 2, as to overlap the rims of the toothed wheels F, and thus prevent the door from being opened until both wheels are so turned that the slots $f'$ may coincide with the said catches I. J is a latch made in the shape of the arc of a quarter of a circle. The inner end of the latch J is attached to the end of a spindle, K, which passes through the lock-plate C and through the door A, and has a cross-head, knob, or other convenient handle, L, attached to or formed upon its outer end. The spindle K may also have a knob or other handle attached to its inner end to enable the latch J to be conveniently operated from the inner side of the door; or said handle may be attached to the said latch J. M is a catch attached to the door-frame or casing B in such a position as to receive the latch J and prevent the door from being opened, even when both the slots $f'$ of the toothed wheels F coincide with the catches I, without first turning the latch J out of the catch M. The latch J and catch M should be so arranged that the latch J cannot be turned to clear the catch M without bringing its point in contact with the teeth of one of the wheels F and locking said wheel, thus preventing burglars from turning back the latch J, and then turning the wheels F gradually while pressing the door A inward. N is a bell, attached to the lock-plate C in such a position as to be struck by the hammers O attached to the spring-levers P. The outer ends of the spring-levers P are attached to the lock-plate C, and their inner ends rest against the teeth of the wheels F, so that the wheels F cannot be turned without sounding an alarm. The bell N also enables the operator acquainted with the combination for opening the door to conveniently count the number of teeth through which he turns the wheels to bring the slots $f'$ around to the catches I. Q are stops attached to the lock-plate A, against which the levers P strike, and which prevent the wheels F from being turned back. To one side of each of the knobs E is attached a point, R, and to the door A, or to a plate or washer attached to said door, is attached another point, S, so that by bringing the points R S to coincide the operator knows when to begin to count. Marks upon the knobs and door would answer the same purpose in daylight; but the points enable the door to be unlocked with equal facility in the dark.

Having thus described my invention, I claim as new and desire to secure by Letters Patent—

1. The combination of nuts H with the tapering spindles D D and conically-perforated cog-wheels F F, to enable the wheels to be forced down upon the spindles, and the combination to be changed, in the manner described.

2. The quadrant-latch J, spindle K, handle L, and catch M combined, as described, with catches I I and slotted wheels F $f'$, so that all must be moved into a certain position before the door can be opened.

3. The combination, in a door-lock, of cog-wheels F $f'$ and catches I I, alarm and detent mechanism M N O P Q, knobbed spindles D having points R and the points S, and the latch mechanism J K L M, all operating as and for the purpose specified.

JACKSON T. TAYLOR.

Witnesses:
   JAMES J. GOODMAN,
   A. F. SIMVIL.